US010617258B2

(12) United States Patent
Moneta et al.

(10) Patent No.: US 10,617,258 B2
(45) Date of Patent: Apr. 14, 2020

(54) ORGANIC MATERIAL GRINDER (71) Applicant: Lift Innovations Inc., St. Andrews (CA)

(72) Inventors: Greg John Moneta, Winnipeg (CA); Matthew John Olson, Winnipeg (CA); Jesse Benjamin Marr, Winnipeg (CA)

(73) Assignee: Lift Innovations Inc., Winnipeg (CA)

( * ) Notice: Subject to any disclaimer, the term of this patent is extended or adjusted under 35 U.S.C. 154(b) by 624 days.

(21) Appl. No.: 15/350,569

(22) Filed: Nov. 14, 2016

(65) Prior Publication Data
US 2017/0135524 A1 May 18, 2017

Related U.S. Application Data (60) Provisional application No. 62/254,793, filed on Nov. 13, 2015.

(51) Int. Cl.
*A47J 42/14* (2006.01)
*A47J 42/24* (2006.01)
*B02C 23/10* (2006.01)

(52) U.S. Cl.
CPC ............... *A47J 42/24* (2013.01); *A47J 42/14* (2013.01); *B02C 23/10* (2013.01)

(58) Field of Classification Search
CPC .. A47J 42/00; A47J 42/02; A47J 42/04; A47J 42/22; A47J 42/24; A47J 42/26; A47J 42/28; A47J 42/30; A47J 42/38; A47J 43/25; A47J 43/255; A47J 43/44; A47J 43/34; A47J 2210/00; B02C 11/04; B02C 13/10; B02C 13/14; B02C 13/16; B02C 13/18; B02C 13/26; B02C 13/28; B02C 13/282; B02C 13/284; B02C 13/2804; B02C 18/08; B02C 2018/162;
(Continued)

(56) References Cited

U.S. PATENT DOCUMENTS 4,280,666 A * 7/1981 Jones ................. A47J 42/34
241/100
6,655,616 B1 * 12/2003 Wagner ................. A47J 42/04
241/169.1
(Continued)

FOREIGN PATENT DOCUMENTS

DE 102011101223 A1 * 10/2012 ............. A47J 42/24

*Primary Examiner* — Shelley M Self
*Assistant Examiner* — Katie L. Parr
(74) *Attorney, Agent, or Firm* — Ryan W. Dupuis; Ade + Company Inc.; Kyle R. Salterthwaite (57) ABSTRACT A grinder for reducing particle size of an organic matter, for example herbs, includes a housing assembly supporting a gauge screen therein to define a cutting chamber thereabove and a receiving chamber therebelow. A plurality of fixed blades are mounted in the cutting chamber in fixed relation to the housing assembly and a plurality of rotating blades rotate relative to the fixed blades to reduce size of the organic matter by cutting, shearing and/or grinding. The gauge screen is replaceable with other screens of different gauge independently of the fixed and rotating blades. The blades are bidirectional and include guide surfaces on the fixed blades which guide material downwardly and into the direction of rotation relative to respective cutting edges of the blades as the rotating blades are rotated relative to the fixed blades in either direction.

15 Claims, 10 Drawing Sheets (58) Field of Classification Search
CPC ......... B02C 23/02; B02C 23/08; B02C 23/10; B02C 23/14; B02C 23/16; B02C 2013/165; B02C 2013/28672; B02C 2013/28681
USPC ..... 241/69, 76, 79, 79.2, 169.1, 280, 83, 95, 241/152.2, 244, 256, 168, 188.1
See application file for complete search history.

(56) References Cited

U.S. PATENT DOCUMENTS

| | | | | |
|---|---|---|---|---|
| 7,422,170 B2* | 9/2008 | Bao | ................ | B02C 18/24 241/168 |
| 8,733,679 B2* | 5/2014 | Camitta | ................ | B02C 18/16 241/169.1 |
| 9,241,597 B2* | 1/2016 | Dukat | ................ | A47J 42/14 |
| 9,510,709 B2* | 12/2016 | Wilson | ................ | A47J 42/14 |
| 9,681,777 B1* | 6/2017 | Dukat | ................ | A47J 42/40 |
| 2002/0084368 A1* | 7/2002 | Bernhardt | ................ | B02C 18/30 241/82.5 |
| 2005/0274835 A1* | 12/2005 | Huang | ................ | A47J 42/04 241/169.1 |
| 2008/0315022 A1* | 12/2008 | Wilson | ................ | A47J 42/08 241/169.1 |
| 2009/0121063 A1* | 5/2009 | Wu | ................ | A47J 42/04 241/169.1 |
| 2012/0067988 A1* | 3/2012 | Yu | ................ | B02C 13/04 241/69 |
| 2012/0091240 A1* | 4/2012 | Delbridge | ................ | A47J 42/04 241/169.1 |
| 2012/0168544 A1* | 7/2012 | Chaoui | ................ | B02C 18/08 241/68 |
| 2016/0100715 A1* | 4/2016 | Staiano | ................ | B02C 18/08 241/79 |
| 2016/0143480 A1* | 5/2016 | Watts | ................ | A47J 42/24 241/69 |
| 2017/0251878 A1* | 9/2017 | Dukat | ................ | A47J 42/14 |

* cited by examiner

ORGANIC MATERIAL GRINDER

This application claims the benefit under 35 U.S.C. 119(e) of U.S. provisional application Ser. No. 62/254,793, filed Nov. 13, 2015.

FIELD OF THE INVENTION

The present invention relates to a grinder for reducing the particle size of an organic material, for example herbs, and more particularly the present invention relates to an organic material grinder including rotating blades which rotate past fixed blades in a shearing action in either one of two opposing directions of rotation and guides surfaces for guiding organic material towards the shearing action between corresponding edges of the blades as the rotating blades are rotated in either direction.

BACKGROUND

There are many known machines for the reduction in size of organic material. One common method use two opposing shells with vertical sharpened posts that counter-rotate to "grind" organic material to a reduced size.

Another common method uses a spinning blade in a cup or bowl that reduces organic material size by a regurgitation process, an example as in a common motorized coffee bean grinder.

SUMMARY OF THE INVENTION

According to one aspect of the invention there is provided a grinder for reducing particle size of an organic material, the grinder comprising:

a housing assembly supporting a gauge screen therein in which the gauge screen includes a plurality of gauge apertures therein so as to define a cutting chamber in the housing assembly above the gauge screen for cutting the organic material therein and a receiving chamber in the housing assembly below the gauge screen for receiving organic material therein which has been reduced in size to a size of the gauge apertures;

at least one fixed blade supported within the cutting chamber of the housing assembly; and at least one rotating blade supported within the cutting chamber for rotation relative to the housing assembly about a cutter axis of the housing assembly at a location between said at least one fixed blade and the gauge screen in an axial direction of the cutter axis;

said at least one rotating blade including a first cutting edge situated at a leading side of the rotating blade when rotated in a first direction of rotation about the cutter axis;

said at least one fixed blade including a first cutting edge in confronting relationship with the first cutting edge of said at least one rotating blade when said at least one rotating blade is rotated in the first direction of rotation for cutting organic material therebetween; and said at least one fixed blade including a first guide surface above the first cutting edge of the fixed blade which extends downwardly towards the first cutting edge of the fixed blade at a slope extending in the first direction of rotation to guide organic material downwardly towards the first cutting edge of the fixed blade as said at least one rotating blade is rotated in the first direction of rotation.

The use of guide surfaces provides an efficient means for cutting as the organic material which is churned by the rotating blades, is repeatedly redirected to an intersection between the cutting edges of the rotating blades and the cutting edges of the fixed blades to force the material to be cut rather than be directed away from the rotating blades.

In the illustrated embodiment, the first cutting edge of said at least one fixed blade comprises a surface lying parallel to the cutter axis which is joined to the first guide surface along the top end of the surface, and a height of said surface is approximately equal to a thickness of said at least one rotating blade in the axial direction.

Typically, the first cutting edge of said at least one rotating blade is also oriented and parallel to the cutter axis.

Also in the illustrated embodiment, said at least one rotating blade is spaced apart from said at least one fixed blade in the axial direction by a prescribed gap which is approximately equal to a thickness of said at least one rotating blade in the axial direction. In this instance, said at least one rotating blade is preferably also spaced apart from the gauge screen in the axial direction by a prescribed gap which is approximately equal to a thickness of said at least one rotating blade in the axial direction.

Preferably said at least one rotating blade comprises a plurality of rotating blades and said at least one fixed blade comprises a plurality of fixed blades different in number from the plurality of rotating blades.

In preferred embodiments, the grinder is bidirectional for cutting in either direction of rotation of the rotating blades relative to the fixed blades. In this instance the grinder preferably further comprises:

said at least one rotating blade including a second cutting edge opposite the first cutting edge so as to be situated at a leading side of the rotating blade when rotated in a second direction of rotation about the cutter axis;

said at least one fixed blade including a second cutting edge in confronting relationship with the second cutting edge of said at least one rotating blade when said at least one rotating blade is rotated in the second direction of rotation for cutting organic material therebetween;

said at least one fixed blade including a second guide surface above the second cutting edge of the fixed blade which extends downwardly towards the second cutting edge of the fixed blade at a slope extending in the second direction of rotation to guide organic material downwardly towards the second cutting edge of the fixed blade as said at least one rotating blade is rotated in the second direction of rotation.

Typically, the grinder includes one or more auxiliary screens which are interchangeable with the gauge screen relative to said at least one fixed blade and said at least one rotating blade.

In order to be readily interchangeable, each gauge screen may comprise a plurality of coupling tabs protruding radially outward from a perimeter of the gauge screen at circumferentially spaced locations. In this instance, the housing assembly comprises a plurality of retainer slots formed in the housing assembly in alignment with the plurality of coupling tabs so as to be arranged to receive respective ones of the coupling tabs therein, in which each retainer slot comprises an internal groove oriented in the circumferential direction to extend partway about the housing assembly which is reduced in radial depth in the circumferential direction so as to radially constrict about the respective coupling tab received therein as the gauge screen is rotated relative to the housing assembly about the cutter axis.

Each gauge aperture in the gauge screen may have a perimeter edge which is polygonal in shape and which lies generally parallel to the cutter axis.

According to the illustrated embodiment, the grinder further comprises:

the housing assembly including a cylindrical wall portion supporting the cutting chamber and said at least one fixed blade therein having at least one opening in a top end for receiving the organic material into the cutting chamber therethrough;

said at least one rotating blade including a shaft coupled to said at least one rotating blade which is rotatably supported on the cylindrical wall portion of the housing assembly to protrude upwardly therefrom; and the housing assembly including a cap member selectively supported above the cylindrical wall portion for relative rotation therebetween which has a socket therein arranged to non-rotatably and releasably couple to the shaft.

In this instance, the shaft may include a coupling portion at the top end thereof which is ferromagnetic, and the socket may include an internal end portion which is magnetic and a side wall portion which is non-ferromagnetic so as to be arranged to magnetically urge insertion of the top end of the shaft fully into the socket.

According to a further aspect of the invention there is provided a grinder for reducing particle size of an organic material, the grinder comprising:

a housing assembly supporting a gauge screen therein in which the gauge screen includes a plurality of gauge apertures therein so as to define a cutting chamber in the housing assembly above the gauge screen for cutting the organic material therein and a receiving chamber in the housing assembly below the gauge screen for receiving organic material therein which has been reduced in size to a size of the gauge apertures;

at least one fixed blade supported within the cutting chamber of the housing assembly; and at least one rotating blade supported within the cutting chamber for rotation relative to the housing assembly about a cutter axis of the housing assembly at a location between said at least one fixed blade and the gauge screen in an axial direction of the cutter axis;

said at least one rotating blade including a first cutting edge situated at a leading side of the rotating blade when rotated in a first direction of rotation about the cutter axis;

said at least one fixed blade including a first cutting edge in confronting relationship with the first cutting edge of said at least one rotating blade when said at least one rotating blade is rotated in the first direction of rotation for cutting organic material therebetween; and an auxiliary screen which is interchangeable with the gauge screen relative to said at least one fixed blade and said at least one rotating blade.

According to another aspect of the present invention there is provided a grinder for reducing particle size of an organic material, the grinder comprising:

a housing assembly supporting a gauge screen therein in which the gauge screen includes a plurality of gauge apertures therein so as to define a cutting chamber in the housing assembly above the gauge screen for cutting the organic material therein and a receiving chamber in the housing assembly below the gauge screen for receiving organic material therein which has been reduced in size to a size of the gauge apertures;

at least one fixed blade supported within the cutting chamber of the housing assembly; and at least one rotating blade supported within the cutting chamber for rotation relative to the housing assembly about a cutter axis of the housing assembly at a location between said at least one fixed blade and the gauge screen in an axial direction of the cutter axis;

wherein the housing assembly further comprises:

a cutting wall portion comprising a cylindrical wall surrounding the cutting chamber which (i) integrally supports said at least one fixed blade thereon, (ii) rotatably supports a shaft supporting said at least one rotating blade thereon, and (iii) interchangeably supports the gauge screen thereon;

a receiving wall portion comprising a cylindrical wall surrounding the receiving chamber which is arranged to be selectively coupled to a bottom end of the cutting wall portion so as to be readily releasable therefrom, the receiving wall portion supporting a sifting screen therein having sifting apertures therein which are smaller than the gauge apertures;

a base member arranged to be selectively coupled to a bottom end of the receiving wall portion so as to be readily releasable therefrom for selectively enclosing the bottom end of the receiving wall portion, the base member including a receptacle formed therein arranged to receive material passing through the sifting screen when coupled to the bottom end of the receiving wall portion; and a cap member arranged to be selectively supported on a top end of the cutting wall portion for selectively enclosing a top end of the cutting chamber, the cap member including a socket therein arranged to be selectively coupled to the shaft of said at least one rotating blade for rotating said at least one rotating blade relative to the housing assembly when the cap member is rotated relative to a remainder of the housing assembly.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Referring to the accompanying figures there is illustrated an organic material grinder generally indicated by reference numeral 10. The grinder 10 is particularly suited for reducing a particle size of an organic material received therein, for example herbs.

The grinder 10 includes a housing assembly which is generally cylindrical in shape having a cap member 12 which is generally circular at a top side of the housing assembly, a base 14 which is generally circular at a bottom side of the housing assembly, and a cylindrical portion extending axially between the cap member and the base.

Figure 4:
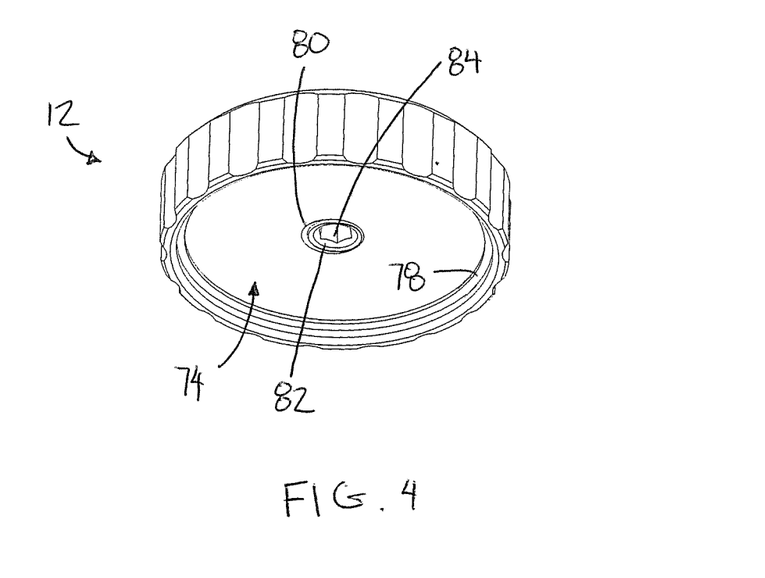
FIG. 4 is a perspective view of a bottom side of the cap member of the housing assembly.
Figure 5:
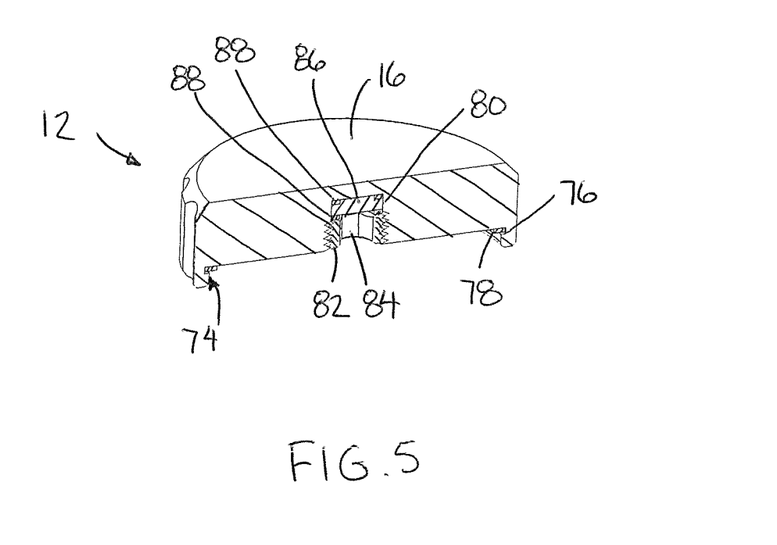
FIG. 5 is a partly sectional perspective view of a top side of the cap member of the housing assembly.

The cap member 12 includes a circular top wall 16 lying perpendicular to the central axis or cutter axis 17 of the housing and a cylindrical perimeter wall portion 18 extending downwardly about a perimeter of the circular top wall which includes texture thereon to provide suitable grip for rotating the cap relative to the remainder of the housing assembly in operation as described in further detail below.

Figure 14:
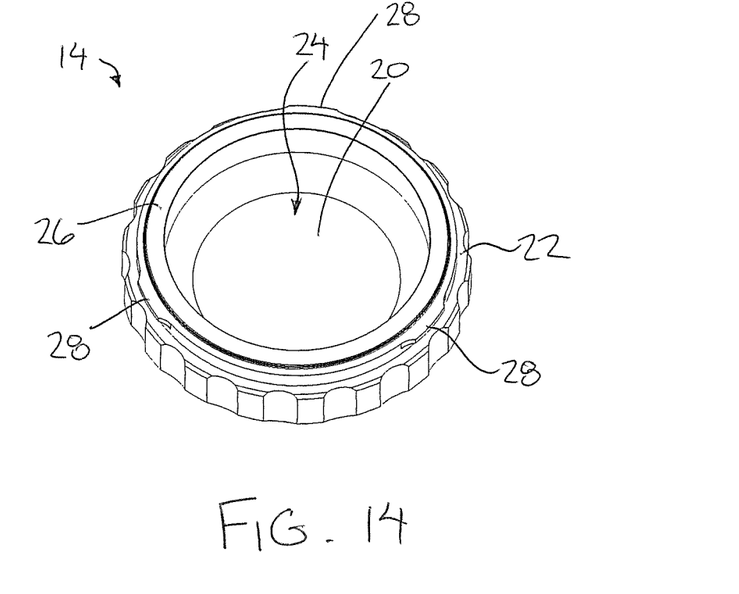
FIG. 14 is a perspective view of a top side of a base member of the housing assembly.
Figure 15:
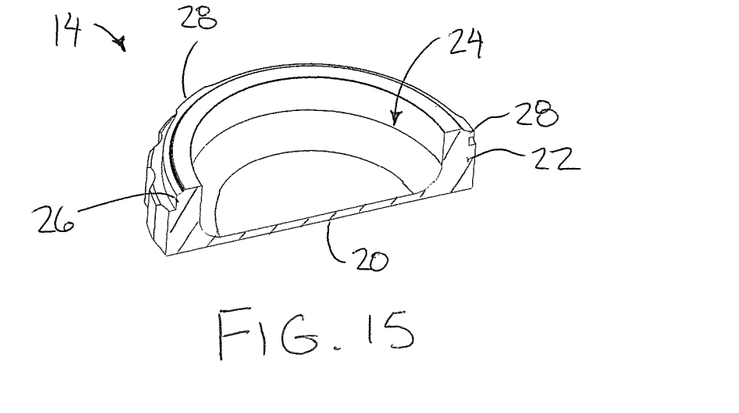
FIG. 15 is a partly sectional perspective view of the base member.

The base 14 includes a circular bottom wall 20 perpendicular to the central axis and a cylindrical perimeter wall portion 22 extending upwardly about a perimeter of the circular bottom wall which also includes texture thereon to provide suitable grip for rotating the base relative to the remainder of the housing during assembly of the housing as described in further detail below. The inner or top side of the base 14 includes a central recess which is generally concave in shape to define a receptacle 24 arranged to receive portions of the ground material therein in some instances.

A circular rim 26 protrudes upwardly from the top of the cylindrical perimeter wall portion 22 in the form of a collar which is reduced in outer diameter relative to the cylindrical perimeter wall portion 22 therebelow. The base 14 is thus stepped in profile and defines a shoulder between the rim 26 and the cylindrical perimeter wall portion 22 therebelow which is annular in shape, lying perpendicular to the central axis of the housing.

Three coupling tabs 28 are located at evenly spaced positions in the circumferential direction on the rim 26 to protrude radially outward from the rim at a location spaced above the shoulder between the rim and cylindrical perimeter wall portion 22. The coupling tabs 28 serve to couple the base to the remainder of the housing assembly as described in further detail below.

Figure 11:
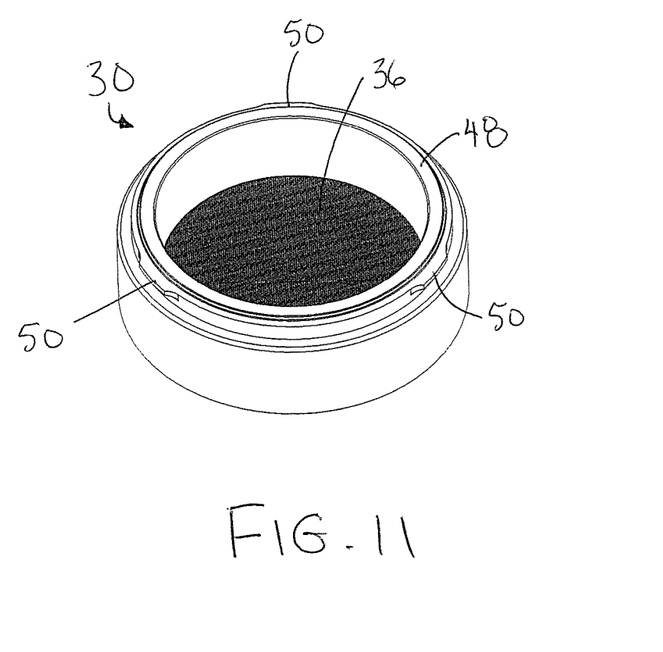
FIG. 11 is a perspective view of a top side of a receiving wall portion of the housing assembly.
Figure 12:
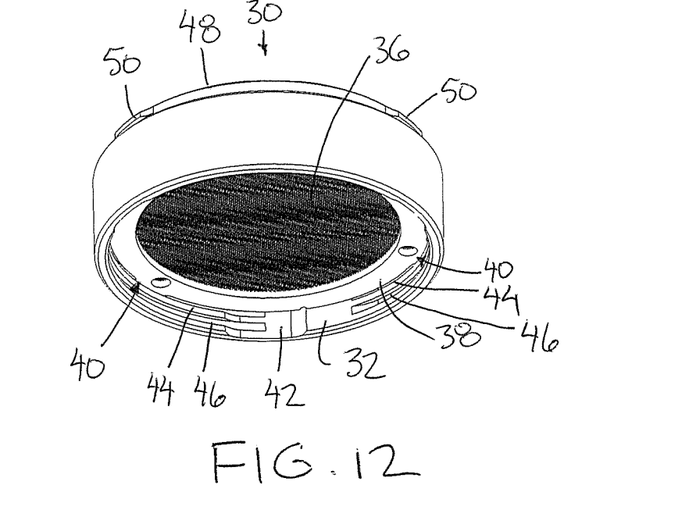
FIG. 12 is a perspective view of a bottom side of a receiving wall portion of the housing assembly.
Figure 13:
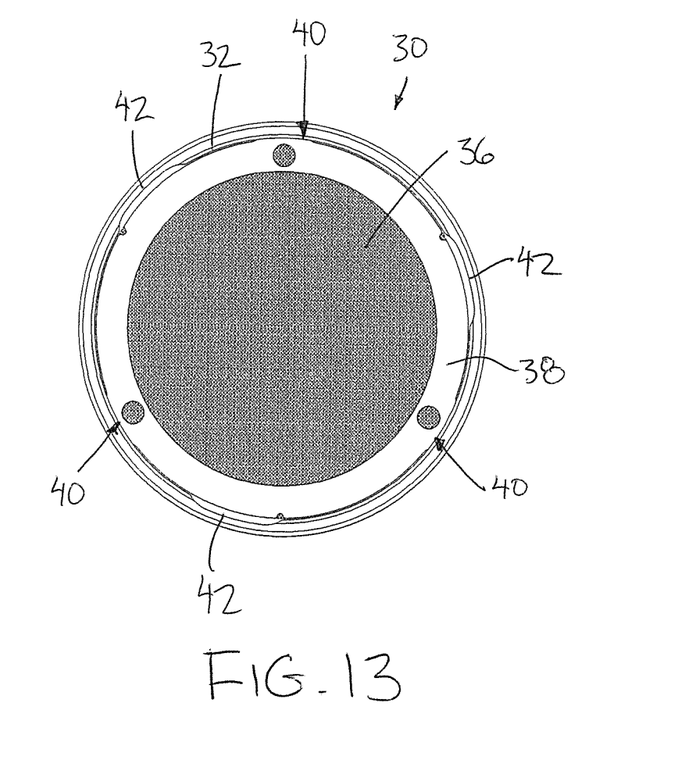
FIG. 13 is a bottom plan view of the receiving wall portion of the housing assembly.

The housing assembly further includes a receiving wall portion 30 in the form of a collar which is generally cylindrical in shape and forms part of the cylindrical wall of the housing between the cap 12 thereabove and the base 14 therebelow. The cylindrical shape of the receiving wall portion 30 extends generally axially between opposing top and bottom open ends. A counter bore 32 is provided in the bottom end of the receiving wall portion in which an interior diameter is increased or stepped outwardly relative to an inner diameter throughout the main portion of the receiving wall portion 30 thereabove to define a shoulder 34 between the counter bore 32 in the main portion of the receiving wall portion 30. The inner diameter of the counter bore 32 is approximately equal to the outer diameter of the rim 26 of the base to readily receive the rim of the base inserted therein in the mounted configuration of the housing assembly.

The counter bore 32 also receives a sifting screen member 36 therein having an outer diameter which fits within the inner diameter of the counter bore for abutment against the shoulder 34 towards the bottom end of the receiving wall portion 30. A retainer ring 38 in the form of a flat rigid metal ring has an outer diameter which also fits within the inner diameter of the counter bore 34 for abutting with the bottom side of the sifting screen member 36 for retaining the sifting screen member against the shoulder 34. The sifting screen member 36 comprises a fine mesh having openings which are smaller than the gauge screen for permitting only the smallest ground particles to fall therethrough into the receptacle of the base member 14 therebelow in the mounted configuration of the housing assembly.

To retain the retainer ring 38 within the bottom of the receiving wall portion 30 of the housing, three coupling tabs 40 are provided at evenly spaced apart positions in the circumferential direction about a perimeter of the retainer ring which protrude radially outward relative to the outer diameter of the retainer ring.

The receiving wall portion 30 in this instance locates three pockets 42 within the counter bore 32 which are evenly spaced apart in the circumferential direction for alignment with respective ones of the coupling tabs 40 of the retainer ring 38 and the coupling tabs 28 of the base. The three pockets 42 comprise portions of the inner surface of the counter bore 32 which are increased in radial dimension from the central axis to define a recessed groove extending axially the full length of the counter bore between the shoulder and the bottom end of the receiving wall portion 30 which is suitably sized to receive the coupling tabs 40 and 28 axially slidable therein. In this manner, the retainer ring can be slid axially into the counter bore until the retainer ring abuts the screen member 36 which in turn abuts the shoulder 34 at the inner end of the counter bore.

A set of three first retainer slots 44 are provided as additional grooves in the wall of the counter bore in which each slot has an open end connected to a respective one of the pockets 42 and extends along a generally helical path partway about the circumference of the receiving wall portion 30 in close proximity to the shoulder 34. In this manner, rotating the retainer ring 38 relative to the receiving wall portion 30 when the retainer ring 38 is abutted with a sifting screen member 36 against the shoulder 34 causes the tabs 40 to be received in respective first retainer slots 44 for tightening in the manner of a threaded screw connection to clamp the retainer ring against the shoulder 34.

Similarly, there is provided a set of three second retainer slots 46 provided as additional grooves in the wall of the counter bore in which each slot 46 has an open end connected to a respective one of the pockets 42 and extends along a generally helical path partway about the circumference of the receiving wall portion 30 at a location spaced slightly below the first retainer slots 44. In this manner, the coupling tabs 28 of the base member 14 can be inserted into the pockets and aligned with the second retainer slots so that rotating the base member relative to the receiving wall portion 30 causes the tabs to be received in respective second retainer slots for tightening the base member to the bottom side of the receiving wall portion 30 of the housing assembly in the manner of a threaded screw connection to clamp the base member 14 against the receiving wall portion 30 of the housing assembly.

The top end of the receiving wall portion 30 includes a rim 48 protruding upwardly from the collar forming the cylindrical outer wall thereof in which the rim 48 is reduced in an outer diameter relative to the cylindrical collar therebelow. Three coupling tabs 50 are located at evenly spaced apart positions in the circumferential direction on the rim 48 to protrude radially outward therefrom for coupling to a cutting wall portion 52 of the housing assembly thereabove as described in further detail below.

Figure 6:
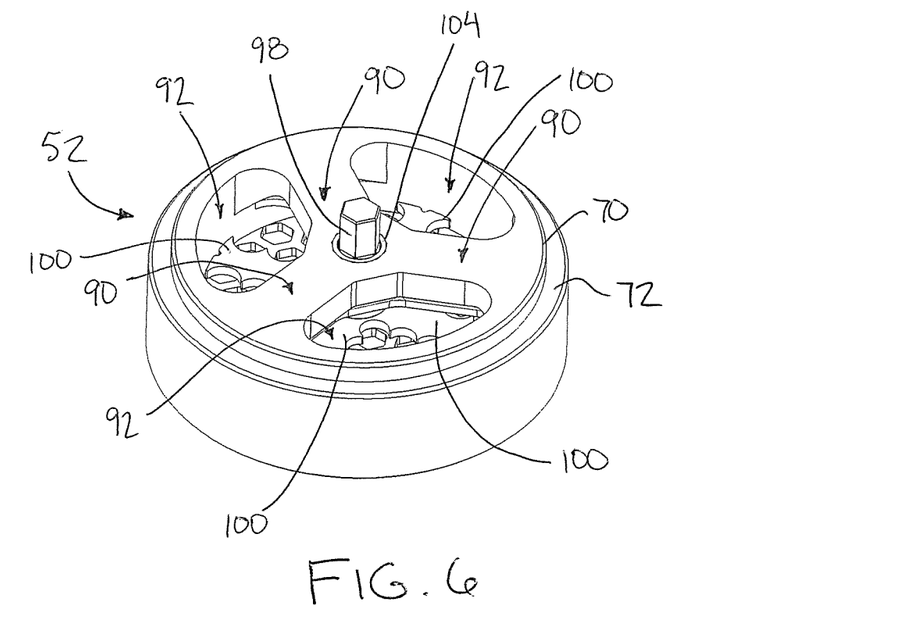
FIG. 6 is a perspective view of a top side of the cutting wall portion of the housing assembly.
Figure 7:
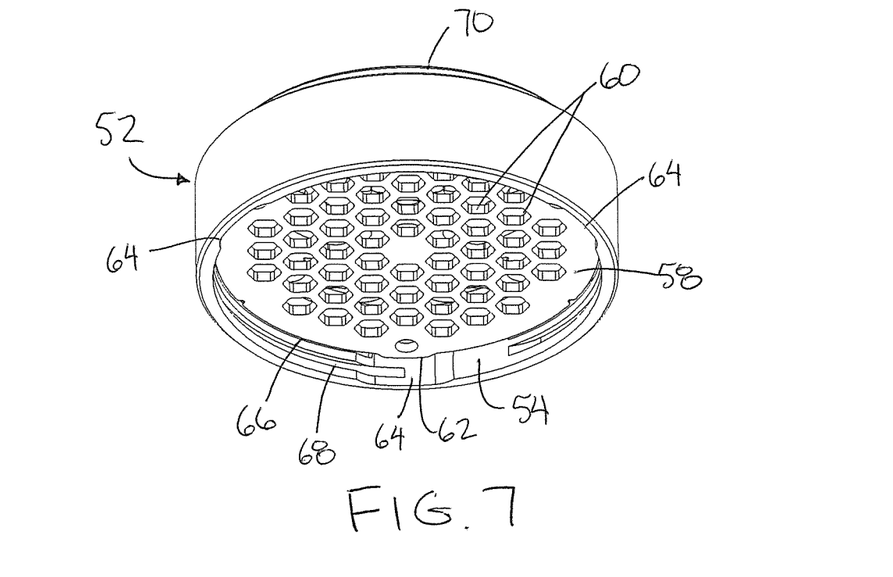
FIG. 7 is a perspective view of a bottom side of the cutting wall portion of the housing assembly.

The cutting wall portion 52 of the housing assembly comprises a collar defining a cylindrical perimeter wall which forms a portion of the cylindrical shape of the housing between the receiving wall portion 30 therebelow and the cap member 12 thereabove in the assembled configuration. Similarly to the receiving wall portion 30 therebelow, the cutting wall portion 52 includes a counter bore 54 in the bottom end thereof in which the inner diameter is increased relative to the remainder of the collar thereabove to define a shoulder 56 which is annular in shape and lies perpendicular to the central axis of the housing.

Figure 8:
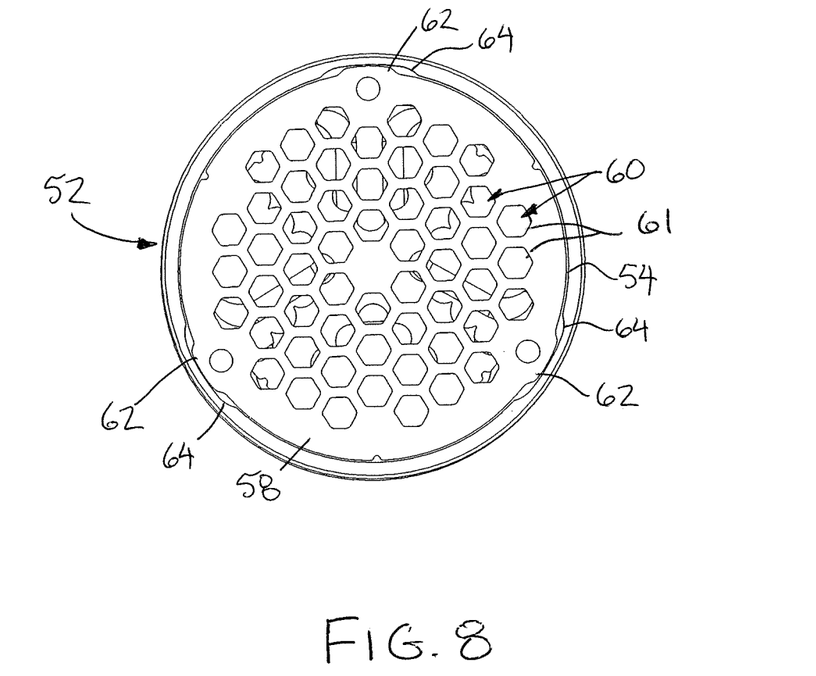
FIG. 8 is a bottom plan view of the cutting wall portion of the housing assembly including the gauge screen inserted therein.
Figure 9:
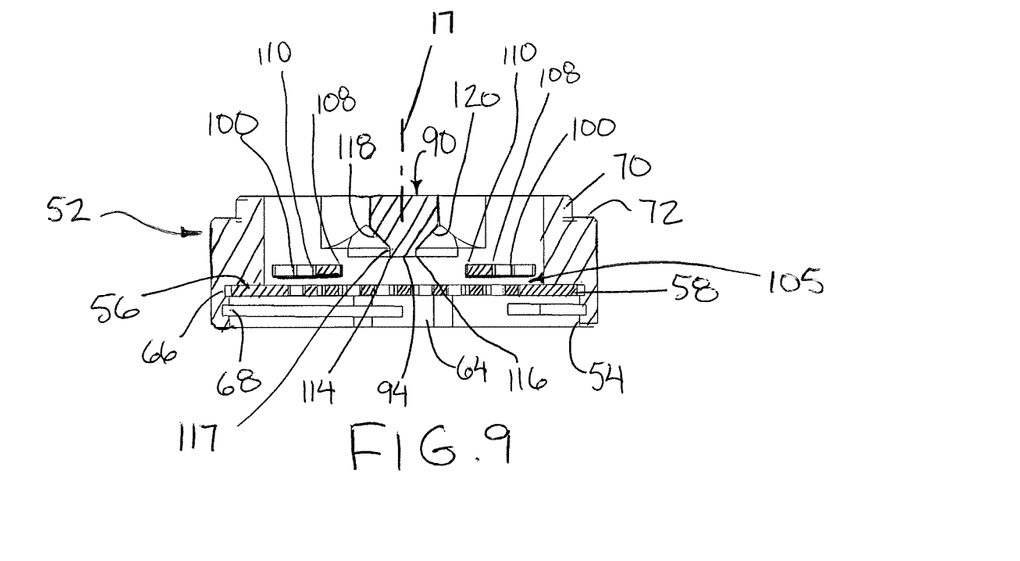
FIG. 9 is a sectional view of the cutting wall portion of the housing including the gauge screen inserted therein.

The counter bore 54 serves to receive a gauge screen member 58 therein. The gauge screen member 58 comprises a rigid plate which is generally circular in shape so as to have an outer diameter which fits closely within the inner diameter of the counter bore 54 for mounting in close abutment against the shoulder 56. The rigid plate includes a plurality of gauge apertures 60 therein which are perforated through the thickness of the plate between the top and bottom faces thereof. Each gauge aperture 60 of the plate is substantially identical in size to other apertures of the plate and has a perimeter edge 61 that is generally hexagonal in shape. The perimeter edges 61 about each opening 60 comprise a flat surface oriented generally parallel to the central axis of the housing between the top and bottom faces of the plate. A central portion of the rigid plate at the axis of the housing is devoid of a gauge aperture for abutment with other components of the grinder 10 as described in further detail below. The polygonall shape of each gauge aperture defined a plurality of flat edges which can contribute to the cutting or shearing action of the grinder in operation.

Once the gauge screen member 58 is inserted within the counter bore 54, the space within the housing immediately above the gauge screen member 58 comprises a cutting chamber primarily located within the cutting wall portion 52 of the housing while the space within the housing immediately below the gauge screen member 58 comprises a receiving chamber primarily located within the receiving wall portion 30 of the housing assembly. Cutting, shearing, or grinding of the organic material to reduce the particle size thereof typically occurs within the cutting chamber as described in further detail below. Once the particle size has been reduced to a size of the gauge apertures in the gauge screen member 58, the particles of reduced size fall through the gauge apertures and are subsequently received within the receiving chamber below the gauge screen member.

In order to control the size of particles to which the organic material is reduced before falling through to the receiving chamber, the grinder 10 typically includes a plurality of gauge screen members 58 which are generally identical to one another with the exception of the size and number of the gauge apertures. A fewer number of larger sized apertures enables larger particle sizes of organic material to fall into the receiving chamber from the cutting chamber such that less reduction in particle size occurs. Alternatively, a larger number of smaller sized apertures enables only smaller particle sizes of organic material to fall into the receiving chamber from the cutting chamber such that a greater reduction in particle size occurs within the grinder.

Figure 10:
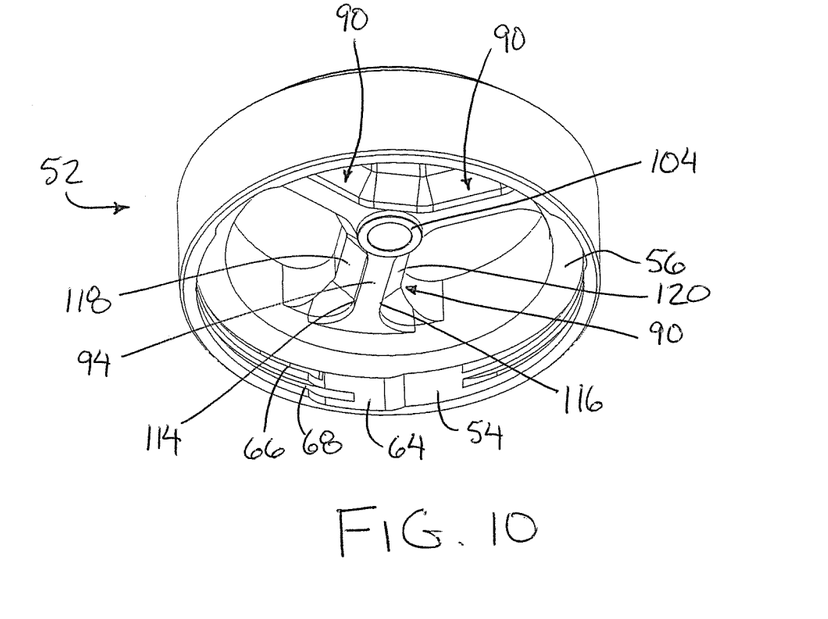
FIG. 10 is a perspective view of a bottom side of the cutting wall portion of the housing assembly with the gauge screen and rotating cutting body removed.

To retain the gauge screen member relative to the cutting wall portion 52 of the housing, the gauge screen member 58 includes three coupling tabs 62 at evenly spaced apart positions in the circumferential direction about the perimeter edge of the plate to protrude radially outward therefrom. The cutting wall portion 52 in this instance includes three pockets 64 within the counter bore 54 similar to the pockets 42 of the receiving wall portion 30. More particularly each pocket comprises a portion of the wall of the counter bore which is increased in radial dimension at the inner surface thereof to define a groove oriented in the axial direction between the counter bore 54 and the bottom end of the cutting wall portion 52. The pockets 64 thus permit the three coupling tabs 62 of the gauge screen member 58 to be axially slidable therein as the gauge screen is inserted through the bottom end of the cutting wall portion 52 into abutment with the shoulder 56.

A set of three first retainer slots 66 are also located within the inner surface of the wall of the counter bore 54 in which each retainer slots 66 has an open end in communication with a respective one of the pockets at a location directly adjacent the shoulder 56 such that the retainer slots extends only partway in the circumferential direction about the circumference of the cutting wall portion in a common direction of rotation with the other retainer slots 66. Each retainer slot comprises a groove with increased radial dimension relative to the central axis of the housing relative to the remainder of the wall of the counter bore, however the depth in the radial direction of the groove forming each first retainer slots 66 is gradually reduced with increasing distance from the respective pockets 64 in the circumferential direction. Accordingly, as the gauge screen member 58 is rotated from a first position in abutment with the shoulder 56 but with the tabs 62 initially received within the pockets 64, the reducing radial depth of the retainer slots results in the retainer tabs being radially constricted and clamped in a radial direction to frictionally retain the gauge screen member 58 within the retainer slots 66 so as to ensure the gauge screen remains fixed during a subsequent grinding operation with the grinder 10. The first retainer slots 66 lie in a common plane directly adjacent the shoulder 56 so as to ensure the gauge screen member 58 remains in close abutment with the shoulder 56 as it is clamped into place to be frictionally fixed relative to the cutting wall portion 52.

The counter bore 54 of the cutting wall portion 52 also includes a set of three second retainer slots 68 at a location spaced below the first retainer slots 66, towards the bottom end of the cutting wall portion 52. Each second retainer slot 68 has an open end in communication with a respective one of the pockets 64 to extend along a generally helical path only partway about the circumference of the cutting wall portion 52. The outer diameter of the rim 48 at the top of the receiving wall portion 30 is suitably sized to be readily inserted into the inner diameter of the counter bore 54 at the bottom of the cutting wall portion 52 with the coupling tabs 50 on the rim 48 of the receiving wall portion 30 being arranged for insertion into the pockets 64 of the cutting wall portion for subsequent alignment with the three second retainer slots 68. Once the rim of the receiving wall portion 30 is inserted into the counter bore of the cutting wall portion and the corresponding coupling tabs 50 are inserted into the pockets 64, subsequent rotation of the receiving wall portion 30 relative to the cutting wall portion 52 causes the coupling tabs 50 to be received along the helical path of the second retainer slots 68 such that the shoulder formed at the top end of the outer wall of the receiving wall portion can be clamped against the bottom edge of the cutting wall portion 52 in the manner of tightening a threaded screw connection to frictionally retain the cutting wall portion coupled relative to the receiving wall portion in the assembled configuration of the housing assembly.

The top end of the cutting wall portion 52 also includes a rim 70 protruding upwardly from the top end of the collar forming the outer wall of the cutting wall portion in which the rim 70 is reduced in outer diameter relative to the remainder of the cutting wall portion therebelow. The top end of the collar connected between the cutting wall portion therebelow and the rim 70 of reduced outer diameter thereabove defines a shoulder 72 which is annular in shape and lies in a plane perpendicular to the central axis of the housing. The shoulder 72 and the circumference of the ring 70 comprise smooth surfaces which are uninterrupted by any protrusions or recesses to be well suited for sliding engagement with respective portions of the cap member 12 abutted thereon for relative rotation in the assembled condition of the housing assembly.

The cap member 12 includes a main bore 74 therein occupying most of the bottom end of the cap so as to have an inner diameter which is close to the outer diameter of the rim 70 of the cutting wall portion 52 to be received therein. The inner end of the main bore 70 comprises a flat circular end face forming most of the bottom side of the cap member 12. An undercut slot 76 is provided in the cylindrical inner wall of the main bore 74 directly adjacent the circular end face which receives an annular plastic bushing 78 therein sized to be retained within the undercut slot but protrude radially inwardly to overlap a peripheral portion of the circular end wall of the main bore 74. The bushing 78 serves to abut the end face of the rim 70 of the cutting wall portion when the cutting wall portion is inserted into the main bore 74 such that the low coefficient of friction of the plastic material of the bushing provides for a smooth relative rotation of the cap member relative to the remainder of the housing assembly therebelow.

A centre bore 80 is located centrally within the circular end face of the main bore 74 at the central axis of the housing which is internally threaded for receiving an externally threaded socket member 82 therein. A socket 84 is formed within the socket member having socket wall portions which are hexagonal in shape in cross section. A circular magnet 86 is sized to be received within the centre bore 80 at the inner end thereof prior to threaded connection of the socket member 82 into the bore. A pair of annular bushings 88 are mounted in abutment with axially opposing ends of the magnet within the centre bore 80. Subsequent to insertion of the bushings and the magnet 86 therebetween within the bore 80, the insertion of the externally threaded socket member 82 into the internally threaded centre bore 80 enables the socket member 82 to clamp the magnet between the socket member and the inner end of the bore to be retained therein in the assembled configuration. The socket member 82 is isolated from the magnet by the bushing and is formed of a non-ferromagnetic material.

Reduction of the particle size of the organic material within the cutting chamber occurs as a result of the configuration of a cutting assembly within the cutting wall portion of the housing. The cutting assembly includes three fixed blades 90 which are formed integrally and seamlessly as a single, unitary body together with the cutting wall portion 52. The three fixed blades 90 are provided at evenly spaced positions in the circumferential direction about the central axis and are joined to one another at respective inner ends at the central axis to extend radially outward therefrom to respective outer ends joined to the outer perimeter wall of the cutting wall assembly. The fixed blades 90 are flush at respective top sides with the top rim 70 such that three openings or ports 92 are effectively formed in the top side of the cutting wall portion in communication with the cutting chamber below the fixed blades. Each fixed blade 90 also includes a bottom face in which the three bottom faces of the blades lie in a common plane perpendicular to the central axis at a location which is spaced above the shoulder 56 of the counter bore 54 at the bottom of the cutting wall portion.

Figure 1:
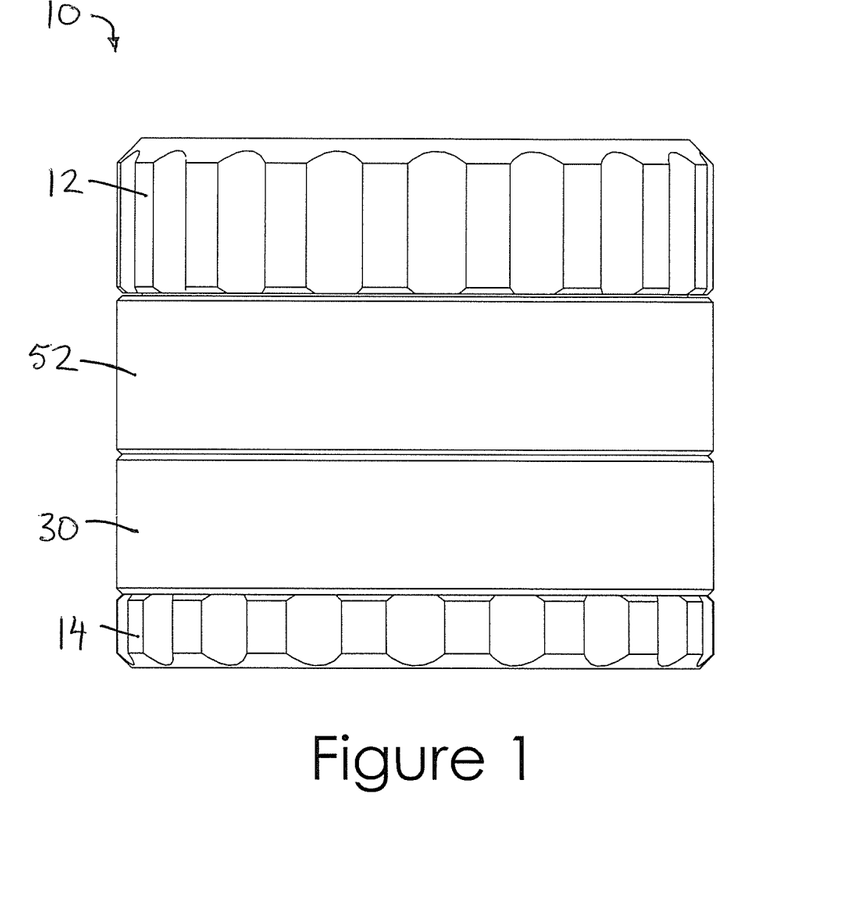
FIG. 1 is a front view of the assembled grinder.
Figure 2:
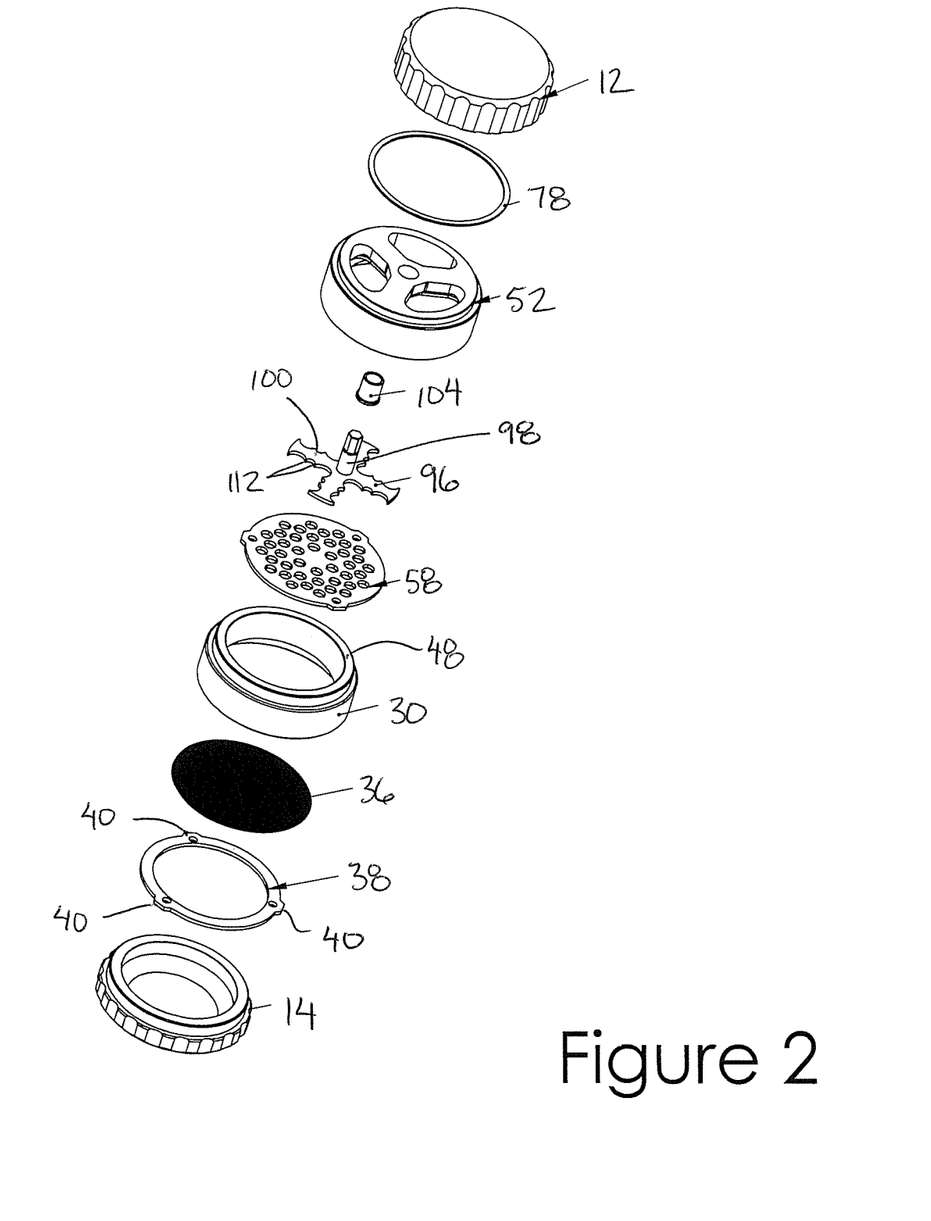
FIG. 2 is an exploded perspective view of the grinder.
Figure 3:
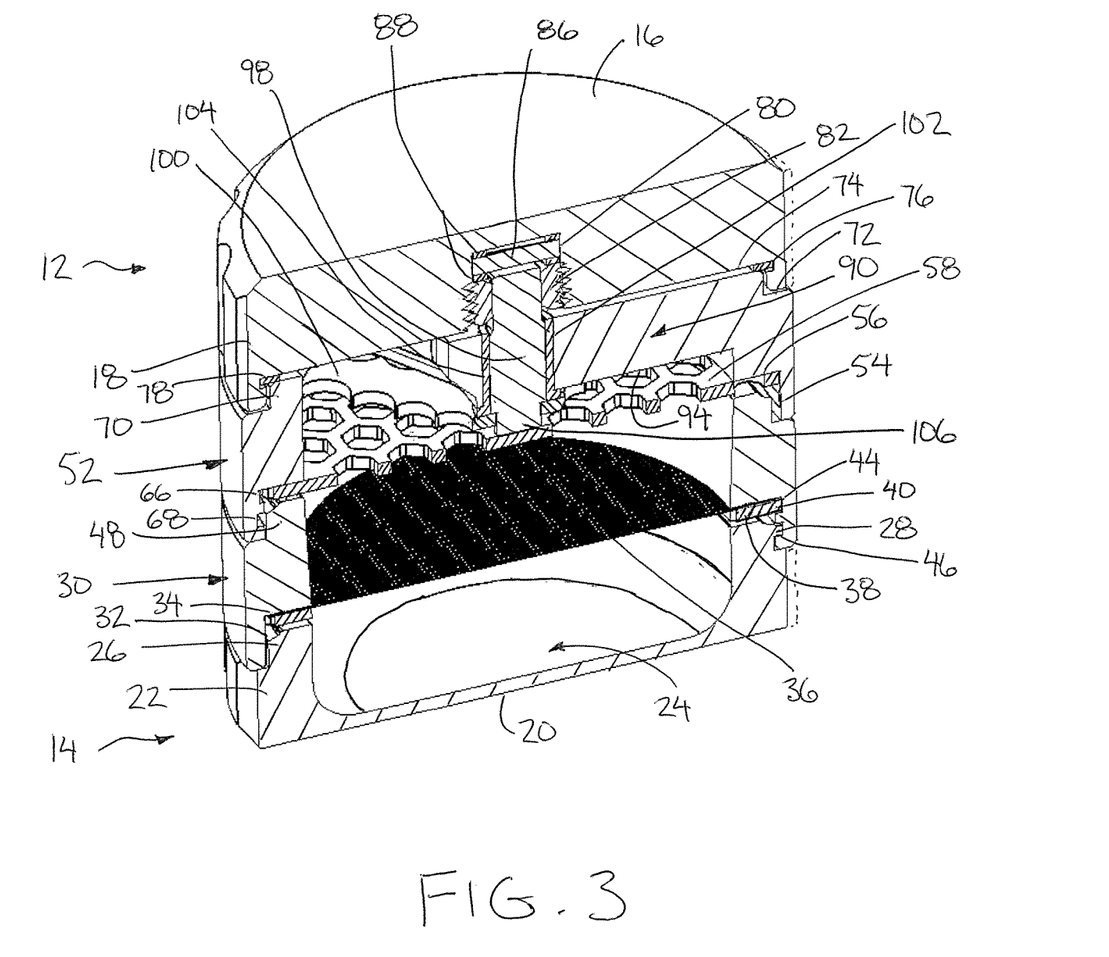
FIG. 3 is a sectional view of the assembled grinder.

A cutter body 96 is rotatably supported within the cutting wall portion 52 of the housing assembly having a shaft 98 supported at the central axis of the housing and a set of four rotating blades 100 extending generally radially outward from the shaft 98 in proximity to the bottom end of the shaft. The shaft is formed of a ferromagnetic material and has a top end which is hexagonal in cross section to match the shape of the socket 84 for being received non-rotatably within the socket. The ferromagnetic material of the shaft ensures that the shaft is magnetically drawn towards the magnet 86 at the inner end of the centre bore 80 to draw the shaft fully into the socket in use. By specifically forming the socket member 82 to be non-ferromagnetic, any magnetic attraction which interferes with full insertion of the hex hexagonal end portion of the shaft into the socket is prevented.

To support the cutter body 96 rotatably within the cutting wall portion 52 of the housing assembly, a shaft bore 102 communicates fully through the single body of material forming the cutter wall portion and the fixed blades 90 at the central axis of the housing corresponding to the inner end of the three fixed blades 90. An annular bushing 104 formed of a plastic material having a low coefficient of friction lines the bore 102 for receiving the main portion of the shaft 98 rotatably therethrough. The bushing includes a collar portion spanning the bore 102 in the axial direction, and a rim protruding outwardly from the bottom end of the collar in abutment with a bottom face of the body of the fixed blades 90 locating the bore 102 therein.

The four rotating blades 100 in this instance are formed of a common rigid plate of material lying in a common plane perpendicular to the shaft at the central axis of the housing assembly. The plate forming the four rotating blades is supported in abutment with the rim at the bottom of the bushing 104 such that the rim of the bushing acts as a spacer providing a prescribed gap 105 between the top side of the four rotating blades 100 and the bottom faces 94 of the fixed blades in the axial direction. A bottom end portion 106 of the shaft protrudes below the plate forming the four rotating blades 100 in the axial direction by a distance of the prescribed pap 105 which is approximately equal to the axial thickness of the rotating blades 100 which is also approximately equal to the distance of the axial gap between the rotating blades 100 and the plane locating the bottom faces 94 of the fixed blades 90 therein. In the mounted position, the bottom end portion 106 of the shaft is located in close abutment with the gauge screen member 58 mounted against the shoulder 56 of the cutting wall portion 52. The four rotating blades 100 are thus centred in the axial direction between the common plane of the bottom faces 94 of the fixed blades thereabove and the upper surface of the gauge screen member 58 therebelow. The bottom end portion 106 of the shaft abuts the gauge screen at the centre of the gauge screen which is devoid of any gauge apertures as noted above.

In the assembled configuration of the housing, with the top end of the shaft mated non-rotatably within the socket 84 of the cap member, rotation of the cap member in either a first direction of rotation, or a second direction of rotation opposite to the first direction of rotation causes the rotating blades 100 to be rotated relative to the fixed blades about the central axis of the housing assembly to produce a cutting, shearing or grinding action between the blades which reduces the particle size of the organic material received within the cutting chamber.

Each rotating blade 100 includes a first cutting edge 108 which defines a leading edge of the blade when the blade is rotated in the first direction of rotation and a second cutting edge 110 forming a trailing edge of the blade when rotated in the first direction. Alternatively, when the blade is rotated in an opposing second direction, the second cutting edge 110 becomes the leading edge while the opposing first cutting edge 108 act as the trailing edge. Each of the cutting edges extends radially along the length of the rotating blade from the central axis to the outer end of the blade and has an edge surface which lies generally parallel to the axis of rotation across the full thickness of the plate material forming the rotating blades 100. The profile of each cutting edge includes a plurality of protruding elements 112 which are pointed and protrude from the remainder of the edge in a circumferential direction into the direction of rotation corresponding to that edge being the leading edge such that the protruding elements assist in gripping organic material to be cut and carrying the material towards the fixed blades during operation.

Each fixed blade 90 includes a first cutting edge 114 and a second cutting edge 116 extending generally radially along opposing sides of the bottom face 94 thereof from the central axis to the outer cylindrical wall portion of the housing assembly. The first cutting edges 114 of the fixed blades are located for confronting the corresponding first cutting edges 108 of the rotating blades 100 when there rotated in the first direction of rotation, such that the cutting edges face towards one another. Likewise, the second cutting edges 116 are situated to confront the second cutting edges 110 of the rotating blades when rotated in the opposing second direction of rotation.

Each of the cutting edges 114 and 116 of each fixed blade comprises an edge surface 117 lying generally parallel to the axis of rotation and having a height extending upward from the flat bottom face 94 by a height which is approximately equal to the axial thickness of the plate forming the four rotating blades 100. The first and second cutting edge surfaces of each fixed blade thus lie generally perpendicularly to the direction of rotation for retaining organic material thereon which has been carried by the rotating blades to encourage cutting, breaking, or shearing of the material as the corresponding rotating blade is rotated past the corresponding fixed blade.

Each fixed blade 90 is also provided with a first guide surface 118 and a second guide surface 120. The first and second guide surfaces taper downwardly and inwardly towards one another as they extend between a wider upper portion of the fixed blade at the top to the first and second cutting edges 114 and 116 respectively at the bottom of the fixed blade. More particularly each first guide surface 118 extends downwardly from the upper portion of the fixed blade along the full length of the blade in the radial direction at a slope oriented into the first direction of rotation towards the first cutting edge surface 114 of the fixed blade. Similarly, each second guide surface 120 extends downwardly from the upper portion of the fixed blade along the full length of the blade in a radial direction at a slope oriented into the second direction of rotation towards the second cutting edge surface 116 of the fixed blade. As illustrated, the guide surfaces are thus both arranged at a non-parallel slope relative to the cutter axis so that the slope extends downward in the respective direction of rotation to guide organic material downwardly towards the respective cutting edge.

Figure 16:
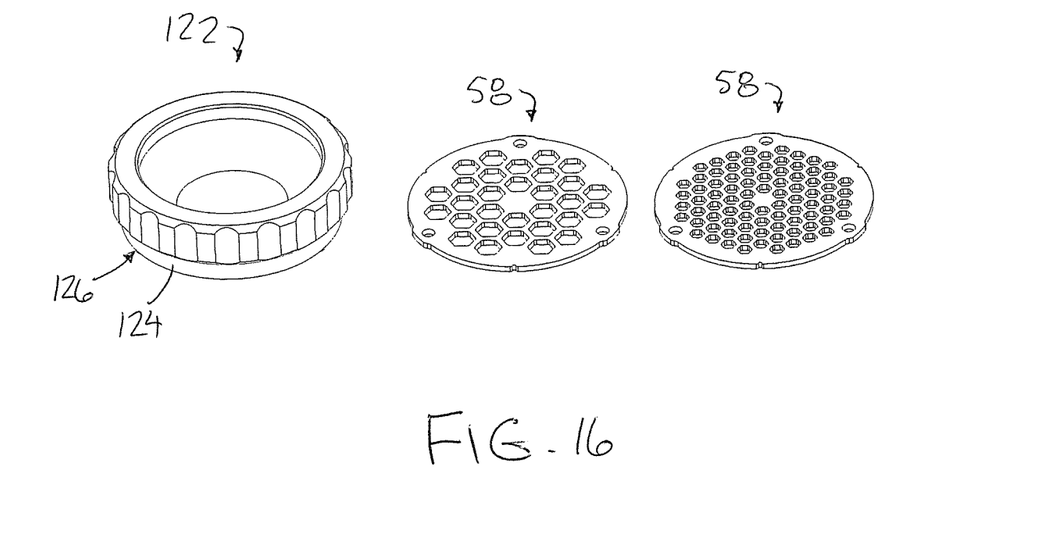
FIG. 16 is a perspective view of a top side of the tool member used for interchanging the gauge screens and a pair of auxiliary gauge screens of different gauges.
Figure 17:
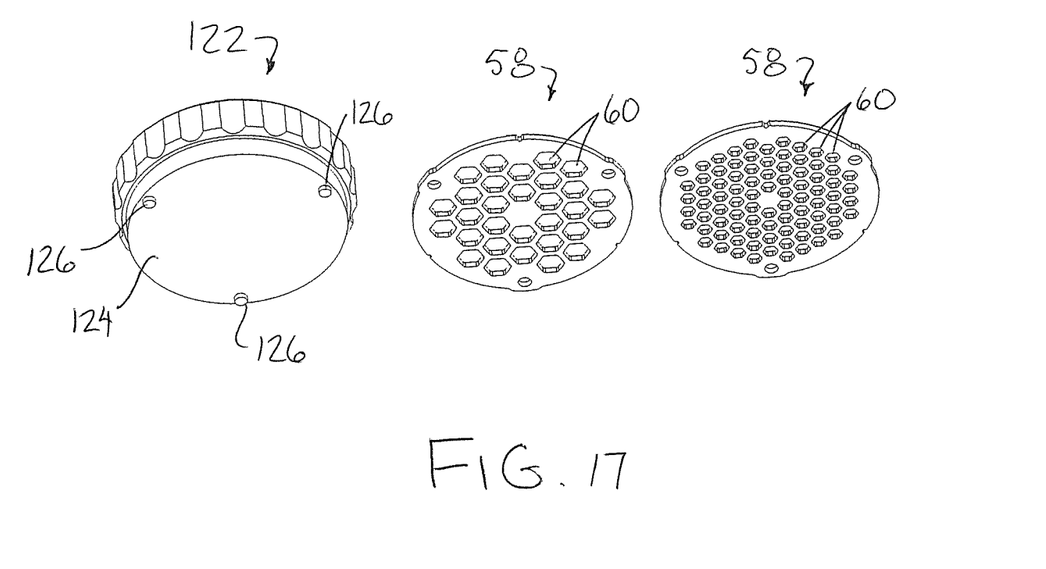
FIG. 17 is a perspective view of a bottom side of the tool member and an auxiliary gauge screens.

The grinder 10 is typically accompanied by a suitable tool member 122 which can be selectively coupled with various components of the grinder for tightening various threaded connections therebetween. The tool member 122 includes a cylindrical body 124 having a circular end face locating three pins 126 thereon which protrude axially outward from the end face of the body 124 at evenly spaced positions in a circumferential direction about a central axis of the tool so as to locate the pins in proximity to the outer perimeter of the body. Each of the gauge screen members 58 and the retainer ring 38 are provided with a set of apertures therein which align with the three pins 126 to allow the pins to be readily inserted therein. When it is desired to tighten either of the gauge screen members or the retainer ring within a respective retainer slots in the corresponding wall portion of the housing assembly, the pins 126 can be inserted into the corresponding apertures in the gauge screen member or retainer ring so that rotating the tool member 122 relative to the wall portion of the housing assembly tightens the threaded connection of the gauge screen or retainer ring relative to the housing. The tool member 122 can be similarly used to release the threaded connection for interchanging components as desired.

The grinder 10 is typically assembled by first inserting the shaft of the cutter body 96 through the bore 102 in the cutter wall portion so as to locate the rotating blades immediately below the fixed blades. The appropriate sized gauge screen member is then selected for insertion into the cutting wall portion for subsequent tightening using the tool member 122. The attachment of the gauge screen member serves to retain the rotating blades axially constricted between the gauge screen member and the fixed blades while remaining rotatable relative to the cutting wall portion of the housing. The upper end of the shaft 98 which is hexagonal cross-section protrudes above the upper surface of the body.

Typically, the sifting screen is then mounted using the retainer ring 38 into the bottom side of the receiving wall portion 30 so that the receiving wall portion can then be coupled to the bottom end of the cutting wall portion 52. The base can likewise then be coupled to the bottom end of the receiving wall portion 30 so that the receiving chamber is defined between the gauge screen member 58 and the sifting screen member 36 while a sifting chamber is defined below the sifting screen member 36 within the receptacle of the base member 14.

A user can then insert material to be reduced in size through the ports of the top end of the cutting wall portion with the cap subsequently inserted to enclose the open top end of the cutting wall portion by the magnetic attraction of the top end of the shaft into the socket within the cap member 12.

The cap member can be freely rotated in a first direction of rotation to drive the rotating blades in the first direction of rotation. This results in the first cutting edges of the rotating blades comprising leading edges of the blades which carry material towards the first cutting edges of the fixed blades with the first guide surfaces being tapered downwardly and into the direction of rotation towards the first cutting edges of the fixed blades. Any material carried by the rotating blades is thus guided by the first guide surface downwardly towards the first cutting edge of the fixed cutting blade where the orientation of the first cutting edge surface perpendicular to the direction of rotation retains material thereon until the rotating blades rotate past to break up the material.

When the cap member is rotated in a second direction of rotation to drive the rotating blades and the second direction of rotation, the second cutting edges of the rotating blades then define leading edges of the blades which carry material towards the second cutting edges of the fixed blades. In this instance the second guide surfaces are tapered downwardly and into the second direction of rotation towards the second cutting edges of the fixed blades. Any material carried by the rotating blades in this instance is guided by the second guide surfaces downwardly towards the corresponding second cutting edges of the fixed blades where the orientation of the second cutting edge surface perpendicular to the direction of rotation retains material thereon until the rotating blades rotate past to break up the material.

In this manner, the organic material is readily cut, sheared, ground or otherwise broken up within the cutting chamber by the relative rotation between the blades in both first and second directions of rotation. By providing a different number of fixed and rotating blades, typically only a single rotating blade engages a single fixed blade for relative cutting action therebetween at any one time in the point of rotation of the rotating blades relative to the fixed blades so as to evenly distribute the manually input force required to drive the blades at any given point in the overall rotation of the cutter body relative to the housing assembly.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A grinder for reducing particle size of an organic material, the grinder comprising:
    a housing assembly supporting a gauge screen therein wherein the gauge screen includes a plurality of gauge apertures therein and wherein the gauge screen defines a cutting chamber in the housing assembly above the gauge screen for cutting the organic material and a receiving chamber in the housing assembly below the gauge screen for receiving organic material therein which has been reduced in size to a size of the gauge apertures;
    at least one fixed blade supported within the cutting chamber of the housing assembly; and
    at least one rotating blade supported within the cutting chamber for rotation relative to the housing assembly about a cutter axis of the housing assembly at a location between said at least one fixed blade and the gauge screen in an axial direction of the cutter axis;
    said at least one rotating blade including a first cutting edge oriented radially of the cutter axis and situated at a leading side of the rotating blade when rotated in a first direction of rotation about the cutter axis;
    said at least one fixed blade including a first cutting edge oriented radially of the cutter axis and facing towards the first cutting edge of said at least one rotating blade whereby said at least one fixed blade and said at least one rotating blade are adapted to cut the organic material between the first cutting edge of said at least one fixed blade and the first cutting edge of said at least one rotating blade when said at least one rotating blade is rotated in the first direction of rotation; and
    said at least one fixed blade including a first guide surface above the first cutting edge of the fixed blade, wherein the first guide surface extends radially while being sloped downwardly towards the first cutting edge of the fixed blade at a non-parallel slope relative to the cutter axis, and wherein the slope extends downwardly in the first direction of rotation towards the first cutting edge of the fixed blade, whereby the first guide surface is adapted to guide organic material downwardly as said at least one rotating blade is rotated in the first direction of rotation.

2. The grinder according to claim 1 wherein the first cutting edge of said at least one fixed blade comprises an edge surface lying parallel to the cutter axis wherein the edge surface is joined to the first guide surface along a top end of the edge surface.

3. The grinder according to claim 2 wherein a height of said edge surface is equal to a thickness of said at least one rotating blade in the axial direction.

4. The grinder according to claim 1 wherein the first cutting edge of said at least one rotating blade is oriented and parallel to the cutter axis.

5. The grinder according to claim 1 wherein said at least one rotating blade is spaced apart from said at least one fixed blade in the axial direction by a prescribed gap.

6. The grinder according to claim 5 wherein the prescribed gap is equal to a thickness of said at least one rotating blade in the axial direction.

7. The grinder according to claim 1 wherein said at least one rotating blade is spaced apart from the gauge screen in the axial direction by a prescribed gap, wherein the prescribed gap is equal to a thickness of said at least one rotating blade in the axial direction.

8. The grinder according to claim 1 wherein said at least one rotating blade comprises a plurality of rotating blades and said at least one fixed blade comprises a plurality of fixed blades different in number from the plurality of rotating blades.

9. The grinder according to claim 1 further comprising:
    said at least one rotating blade including a second cutting edge opposite the first cutting edge so as to be situated at a leading side of the rotating blade when rotated in a second direction of rotation about the cutter axis;
    said at least one fixed blade including a second cutting edge oriented radially of the cutter axis and facing towards the second cutting edge of said at least one rotating blade when said at least one rotating blade is rotated in the second direction of rotation for cutting organic material therebetween;
    said at least one fixed blade including a second guide surface above the second cutting edge of the fixed blade, wherein the second guide surface extends radially while being sloped downwardly towards the second cutting edge of the fixed blade at a non-parallel slope relative to the cutter axis, and wherein the slope extends downward in the second direction of rotation, whereby the second guide surface is adapted to guide organic material downwardly towards the second cutting edge of the fixed blade as said at least one rotating blade is rotated in the second direction of rotation.

10. The grinder according to claim 1 further comprising an auxiliary screen, wherein the auxiliary screen is interchangeable with the gauge screen relative to said at least one fixed blade and said at least one rotating blade.

11. The grinder according to claim 1 wherein the gauge screen comprises a plurality of coupling tabs protruding radially outward from a perimeter of the gauge screen at circumferentially spaced locations and wherein the housing assembly comprises a plurality of retainer slots formed in the housing assembly in alignment with the plurality of coupling tabs whereby the retainer slots are arranged to receive respective ones of the coupling tabs therein, each retainer slot comprising an internal groove oriented in the circumferential direction to extend partway about the housing assembly wherein the internal groove is reduced in radial depth as the internal groove extends in the circumferential direction, whereby the internal groove is adapted to radially constrict about the respective coupling tab received therein as the gauge screen is rotated relative to the housing assembly about the cutter axis.

12. The grinder according to claim 1 wherein each gauge aperture in the gauge screen has a perimeter edge, wherein the perimeter edge is polygonal in shape.

13. The grinder according to claim 12 wherein the perimeter edge of each gauge aperture lies parallel to the cutter axis.

14. The grinder according to claim 1 further comprising:
the housing assembly including a cylindrical wall portion supporting the cutting chamber and said at least one fixed blade therein, the housing assembly having at least one opening in a top end for receiving the organic material into the cutting chamber therethrough;
said at least one rotating blade including a shaft coupled to said at least one rotating blade wherein the shaft is rotatably supported on the cylindrical wall portion of the housing assembly to protrude upwardly therefrom; and
the housing assembly including a cap member removably supported above the cylindrical wall portion for relative rotation therebetween wherein the cap member has a socket therein arranged to non-rotatably and releasably couple to the shaft.

15. The grinder according to claim 14 wherein the shaft includes a coupling portion at the top end thereof, wherein the top end is ferromagnetic, wherein the socket includes an internal end portion and a side wall portion, wherein the internal end portion is magnetic, and wherein the side wall portion is non-ferromagnetic, whereby the shaft and the socket are arranged to magnetically urge insertion of the top end of the shaft fully into the socket.

* * * * *